Aug. 2, 1932.  A. F. KASPER  1,870,124
TRAP
Filed April 27, 1931  2 Sheets-Sheet 1
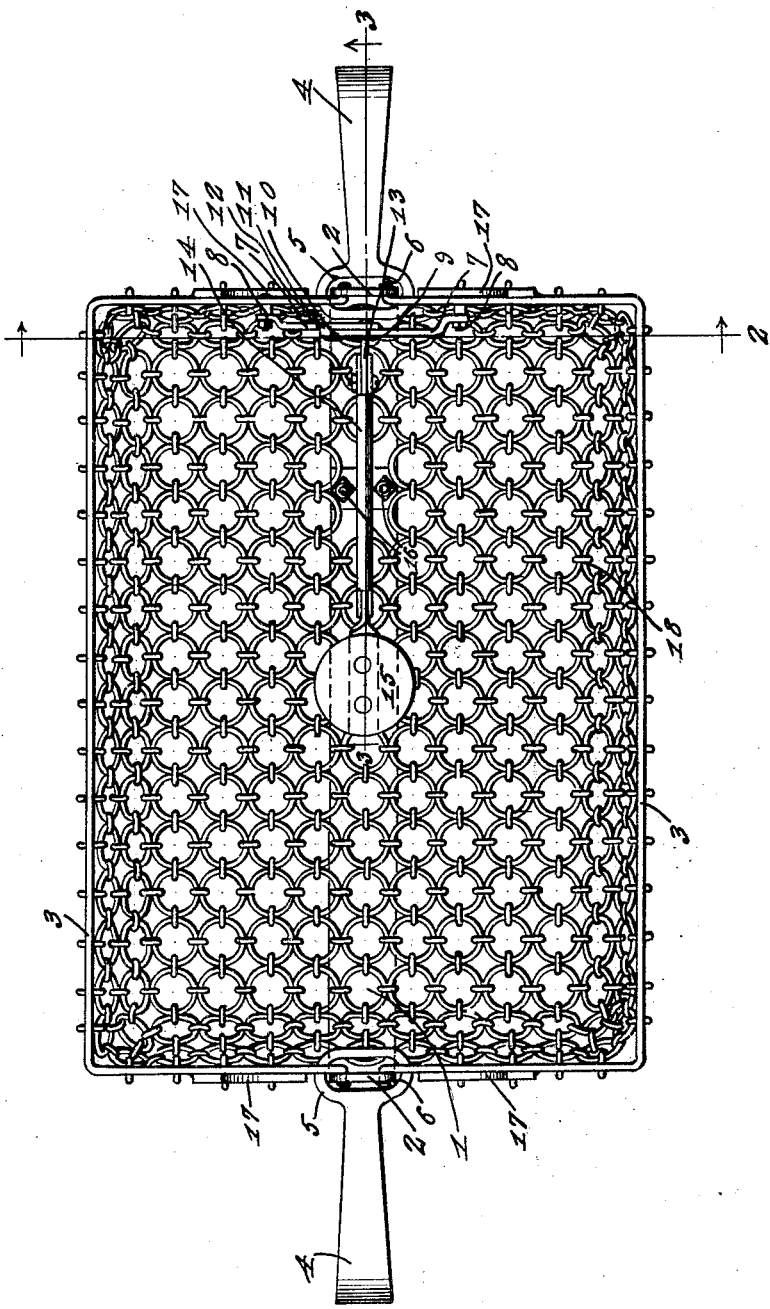
A. F. Kasper, INVENTOR
BY Victor J. Evans
and Co.  ATTORNEYS

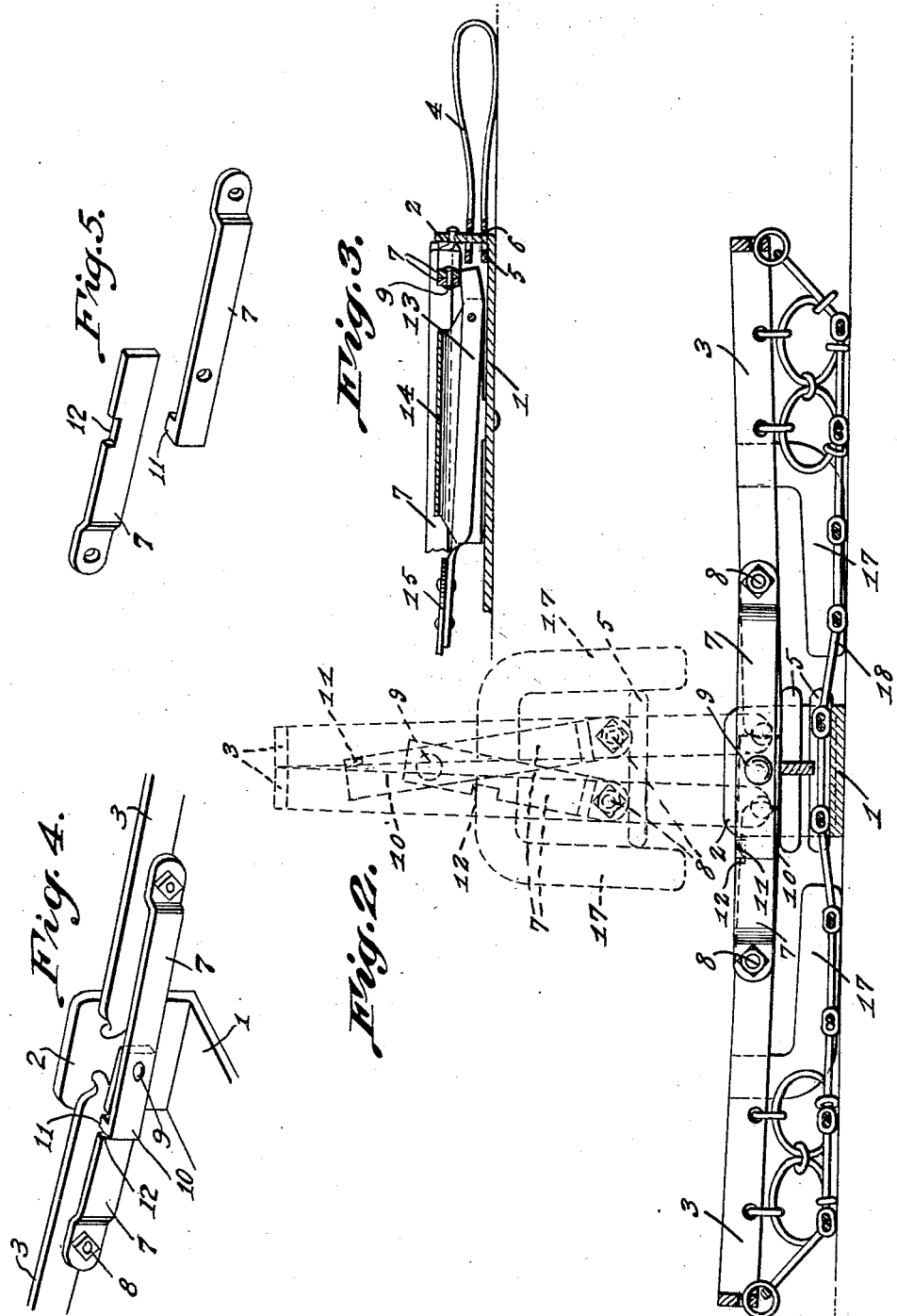

Patented Aug. 2, 1932

1,870,124

UNITED STATES PATENT OFFICE

ALVIN F. KASPER, OF POTTER, WISCONSIN

TRAP

Application filed April 27, 1931. Serial No. 533,314.

This invention relates to traps especially adapted to reduce to a minimum the chances of injuring or mutilating an animal, bird or other wild life when caught therein and obviate undue suffering of the animal or bird while being retained by the trap.

Another object of this invention is the provision of spring actuated jaws carrying a covering and so constructed that when the trap is set, the jaws and covering will lie flat to permit the trap to be easily concealed from view by covering the latter with leaves, grass or other growth, thereby rendering the device unnoticeable and especially adaptable for catching timid or shy animals which will not enter traps when they are exposed to view.

A further object of this invention is the provision of the jaws and tension means so arranged that in case of a portion of an animal, such as the leg or tail being caught between the jaws when the animal is confined within the covering and between the said jaws, the animal may readily extract that portion held between the jaws and thereby obviate discomfort to the animal when confined within the trap.

A further object of this invention is the provision of a catch and trip so located relative to the jaws and cover that an animal when stepping on or engaging the latter will have progressed into the trap sufficiently far that the jaws carrying the cover may swing about the animal and retain the latter within a complete enclosure and against any possible chance of escape.

A still further object of this invention is the provision of a trap of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which:

Figure 1 is a top plan view illustrating a trap constructed in accordance with my invention and showing the trap in a set position.

Figure 2 is a sectional view taken on the line 2—2 of Figure 1.

Figure 3 is a sectional view taken on the line 3—3 of Figure 1.

Figure 4 is a fragmentary perspective view, illustrating the arms holding the jaws in set position.

Figure 5 is a detail view illustrating the arms.

Referring in detail to the drawings, the numeral 1 indicates an elongated base adapted to rest evenly upon the ground and has its ends bent angularly to form attaching ears 2 to which substantially U-shaped jaws 3 are pivoted. Tension or spring members 4 having apertured ends are mounted on the ears and jaws 3 for the purpose of normally urging the jaws together as shown in dotted lines in Figure 2. The apertured ends of the spring members 4 are preferably in the form of heads 5 having elongated slots 6 which receive the side members of the jaws and the ears.

Arms 7 are secured to the side members of the jaws by pivots 8 and are pivotally connected as shown at 9 with one of the ends of the arms projecting beyond the pivot to form an extension 10 having a laterally extending projection 11 adapted to engage in a notch 12 of the other arm when the jaws are disposed as shown in Figure 1. The pivot 9 is then positioned in a plane below the pivots 8 and due to the projection 11 fitting in the notch 12, the jaws will be held in a spread or set position.

A combined catch and trip 13 is pivotally mounted within a guard 14 carried by the base with one end disposed under the arms 7 at the pivot 9 while the opposite end carries a treadle 15 disposed intermediate the ends of the base. When the jaws are in a spread or set position as shown in Figure 1, the catch disposed under the arms 7, the treadle 15 will be supported in an elevated position, so that the weight of an animal thereon will rock the catch 13 on its pivot swinging the arms upwardly, freeing the jaws and allowing them to move into engagement with each other by the influence of the spring members 4.

As shown in Figure 2 when the jaws are in a closed position as shown in dotted lines, the pivots 8 will limit the upward movement of one of the spring members on the side members of the jaws.

The guard 14 is secured to the base by bolts or like fasteners 16 and is of such a construction that the major portion of the trip is housed or protected thereby and provides an efficient pivotal mounting for the trip as shown in Figure 3.

Substantially L-shaped rests 17 are carried by the side members of the jaws and when the latter are in a set position, the rests engage the ground along with the base thereby steadying the device.

A metallic flexible covering 18 constructed from a plurality of interlocking links is secured to the jaws and the rests and overlies the base 1 so that when the jaws are released from a set position and assume a position shown in dotted lines in Figure 2, a complete enclosure is formed by the cover so that an animal, bird or the like confined therein will be prevented from escape. When the jaws are in a set position the guard and treadle 15 are disposed over the cover.

Due to the elongated slots in the heads 5 of the tension member 4, the jaws when in a closed position as shown in dotted lines in Figure 2, may have a limited movement relative to each other so that should an animal when caught in the device with its tail or leg between the jaws, the animal can readily extract that part and thereby obviate discomfort to the animal when confined in the device.

A device constructed in accordance with the foregoing has many advantages due to its simplicity and few number of parts as the device when not in use can be conveniently carried from one place to another and when placed in a set position either in the water or on land it will be extremely easy to conceal the device from view by simply spreading foliage about and over the same. Also this device will operate successfully to catch animals or birds without the employment of bate as the same may be concealed from view within feeding places or paths leading to such places and frequented by animals so that on entering or stepping into the trap, the treadle 15 will be engaged freeing the jaws and moving the cover entirely about the animal.

While I have shown and described the preferred embodiment of my invention it will be understood that minor changes may be made without departing from the spirit and scope of my invention as claimed.

Having thus described my invention, what I claim is:

1. A trap comprising a base, jaws pivoted to said base and adapted to occupy a horizontal position when set, tension means for urging the jaws together and into a vertical position, a pair of arms pivotally connected to the jaws, a pivot connecting said arms with one end of one of the arms extended to provide an extension and the other arm having a notch, a lug on the extension and fitting in the notch with the pivot between said arms disposed in a plane below the pivots between said arms and jaws for holding the latter in a set position, a trip carried by the base and engaging under the arms to swing said arms on their pivots for freeing the jaws from a set position, and a cover carried by said jaws.

2. A trap comprising a base, jaws pivoted to said base and adapted to occupy a horizontal position when set, tension members having elongated slots receiving said jaws for urging the latter towards each other when freed from a set position, a trip for holding the jaws in a set position against the action of said tension members, L-shaped rests carried by the jaws and cooperating with the base in supporting the device when the jaws are in a set position, and a cover carried by the jaws and L-shaped rests.

In testimony whereof I affix my signature.

ALVIN F. KASPER.